United States Patent [19]

Burdenko

[11] Patent Number: 5,162,955
[45] Date of Patent: Nov. 10, 1992

[54] APPARATUS FOR WRITING SERVO INFORMATION ONTO A MAGNETIC DISK

[75] Inventor: Michael N. Burdenko, Wellesley, Mass.

[73] Assignee: Digital Equipment Corporation, Maynard, Mass.

[21] Appl. No.: 546,386

[22] Filed: Jun. 29, 1990

[51] Int. Cl.$^5$ .............................. G11B 5/596
[52] U.S. Cl. ................ 360/77.02; 360/77.03; 360/77.05; 74/96
[58] Field of Search ............... 360/77.01, 77.02, 77.03, 360/75, 77.05; 33/1 PT, 1 N; 74/96

[56] References Cited

U.S. PATENT DOCUMENTS 4,831,470 5/1989 Brunnett et al. .................. 360/75
4,980,783 12/1990 Moir et al. ..................... 360/77.02

OTHER PUBLICATIONS

Hewlett Packard Application Note 325-11 "Disk Drive Servo-Track Writing With Laser Interferometers".
Five Sheets of Technical Drawings for the WREN III STW, Jun. 15, 1989; CD/MPI.

Primary Examiner—Joseph L. Dixon
Assistant Examiner—David L. Robertson
Attorney, Agent, or Firm—Fish & Richardson

[57] ABSTRACT

An apparatus for writing servo tracks on a magnetic disk in a head disk assembly having a head, a moveable actuator for positioning the head relative to the disk, and an actuator drive for moving the actuator to position the head at selected radial positions relative to the disk for writing the servo tracks at those positions, the apparatus including a support for supporting the head disk assembly in the apparatus in a writing position to have the tracks written, a biased tracking element mounted to be biased against the actuator when the head disk assembly is in its writing position, thereby to track the movement of the actuator and the head to the selected radial positions, and a feedback circuit connected between the tracking element and the actuator drive for monitoring the position of said tracking element as a measure of the radial position of the head for controlling the action of the drive to move the head to the selected radial positions within a desired degree of radial accuracy.

25 Claims, 5 Drawing Sheets

APPARATUS FOR WRITING SERVO INFORMATION ONTO A MAGNETIC DISK

BACKGROUND OF THE INVENTION

The invention relates to the writing of servo information on magnetic disk recording media.

Figure 1:
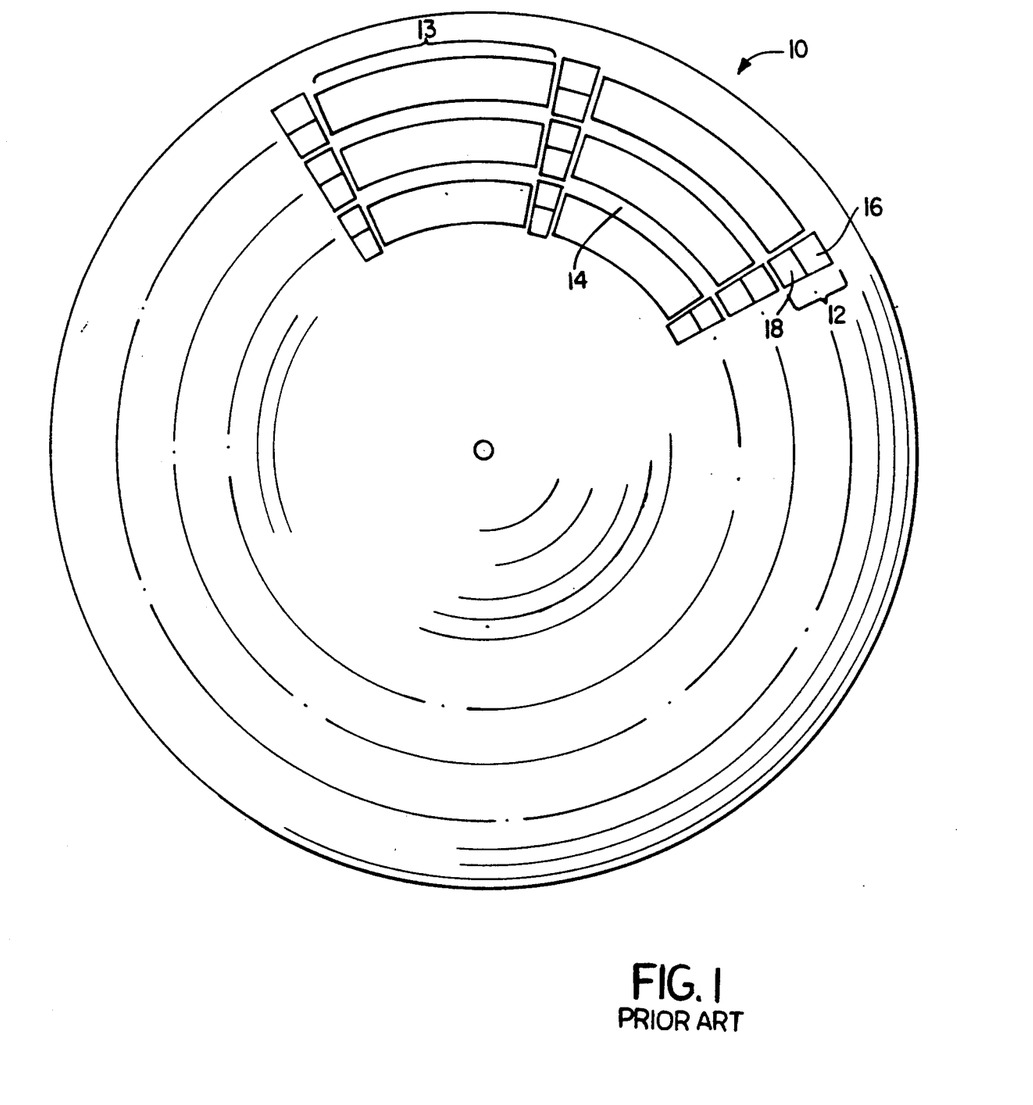
FIG. 1 is an example of the organization of information on a conventional disk.

The organization of information recorded on a magnetic disk as known to the prior art is shown in FIG. 1. The magnetic disk 10 is divided into a series of concentric rings 12 termed tracks. Each track is circumferentially divided into a series of sectors 13. Each track 12 is separated from each adjacent track 12 by a ring called a guard band 14 in which nothing is recorded. The guard bands 14, which alternate with the tracks 12, provide a safety area so that a read/write head writing to a track 12 may deviate from the exact center of the track 12 and not corrupt the data written on adjacent tracks 12.

When a read/write head is moved to a specified track 12, it determines its actual position relative to the center of the track 12, by locating servo blocks 16 and 18. The two servo blocks 16 and 18 are located between adjacent sectors 13. The servo blocks 16, 18 are positioned radially adjacent each other, straddling the track with which they are associated such that their common boundary lies at the center of the track. The outer servo block 16 has a different magnetic orientation than does the inner servo block 18. Each block therefore induces a different polarity signal in the read/write head as the block passes under the read/write head. When the head is positioned over the center of the track 12, both servo blocks 16, 18 induce an equal but opposite signal in the head. If however, the head is not positioned over the center of the track, for example, if the head is located too far toward the inner circumference of the track, the inner servo block 18, will induce a stronger signal in the recording head than will the outer servo block 16. The circuit which controls and determines the head position will detect this condition and move the head back toward the outer edge of the disk until the signals from both servo blocks 16, 18 are equal.

The formatting of the disk into tracks, sectors, guard bands, and servo blocks, as well as the recording of other servo information on the disk during the disk's manufacture is performed by a device called a servowriter. The servowriter positions a read/write head accurately and repeatably at specified radial distances from the disk center so that the formatting of all the disks will be the same. Typically, the accurate positioning of the head at certain distances from the center of the disk is accomplished through the use of optical encoders attached to the positioning mechanism.

However, as the number of tracks per inch is increased to increase the information density of the disk, resulting in narrower tracks and guardbands, a need arises for an increase in the accuracy with which the read/write head is radially positioned during the formatting of the disk.

SUMMARY OF THE INVENTION

The invention features, in various aspects, improvements for supporting a head disk assembly in a position to write servo information on a disk, for tracking the movement of the head actuator that writes the servo information, and for feeding back information from the tracking of the head actuator to control head position to a desired degree of accuracy.

In one general aspect the invention features a support for supporting the head disk assembly in a writing position to have servotracks written on a magnetic disk therein; a biased tracking element mounted to be biased against the head-positioning actuator of the head disk assembly when the assembly is in its writing position, thereby to track the movement of the actuator and the head to select radial positions for writing the servotracks at those positions; and a feedback circuit connected between the tracking element and the actuator drive to monitor the position of the tracking element and control the action of the drive within a desired degree of radial accuracy.

In preferred embodiments of this aspect of the invention there are the following additional features. The tracking element is a pin mounted on a rotatable crank. The axes of radial rotation of the actuator and the crank will be parallel when the assembly is in the write position. The tracking element is biased by a torsion spring that applies a force just sufficient to keep it in contact with the actuator without substantially altering the motion of the actuator. The feedback circuit includes a laser, and a retroreflector mounted on the tracking element.

In a second general aspect the invention features a support for the head disk assembly, which is moveable between a retracted position in which the head disk assembly is out of contact with the tracking element so that the head disk assembly is free to be inserted in or removed from the apparatus, and an advanced position in which the tracking element is positioned to track the movement of the head actuator.

In preferred embodiments of this aspect of the invention there are the following additional features. The head disk assembly includes a housing with an arcuate slot to allow entrance of the tracking element when the support is in its advanced position. The support interacts with an aligning member spaced tranversely of its axis of movement, the aligning members including a stationary stop, and a moveable member positioned to move the assembly against the stop. A second support initially receives the head disk assembly with the first support retracted and out of contact with the assembly; the first support then comes into contact with, and lifts, the assembly as it moves toward its advanced position. A pin and chamfered hole arrangement intially aligns the assembly as it comes into contact with the first support.

Other advantages and features of the invention will become apparent from the following description of the preferred embodiment and from the claims.

DESCRIPTION OF AN ILLUSTRATIVE EMBODIMENT

Figure 2:
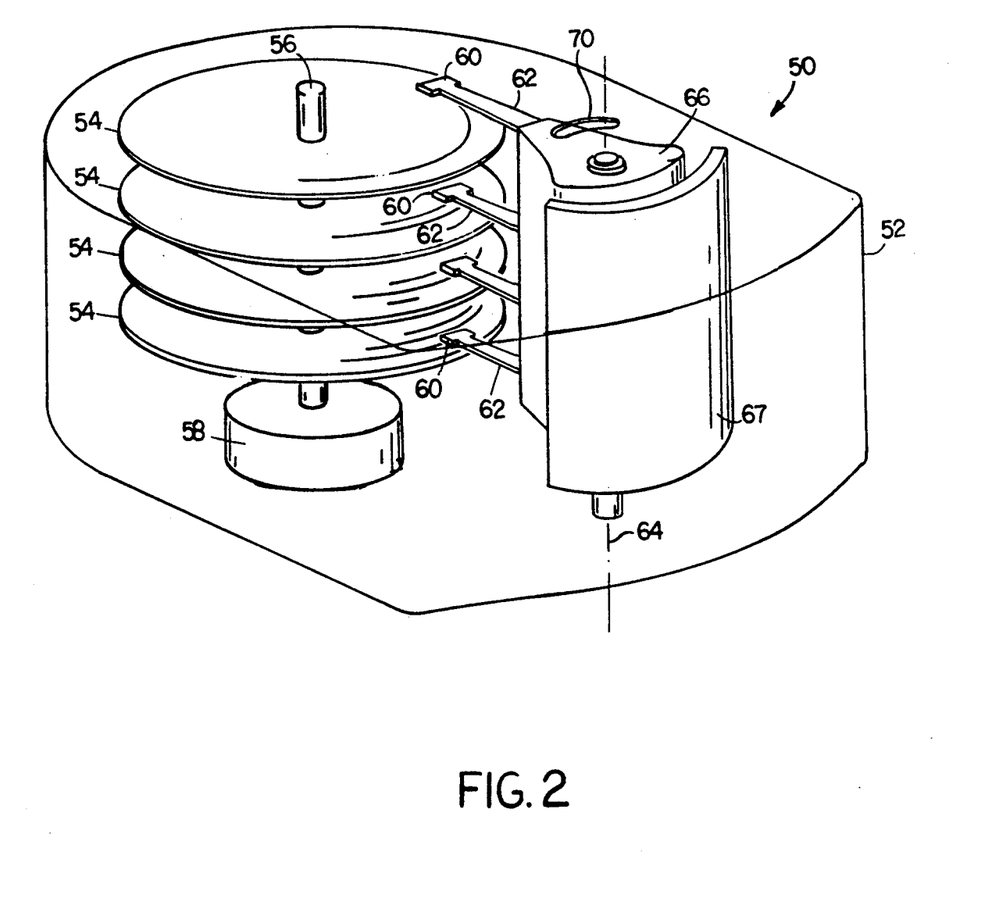
FIG. 2 is an isometric drawing of a head disk assembly.

Referring to FIG. 2, a head disk assembly 50 (HDA) comprises a housing 52 within which a set of magnetic recording disks 54, called platters, are stacked one above the other and coaxially anchored to a spindle 56. The spindle 56 communicates with a drive motor 58, also located within the housing 52. In operation, the drive motor 58 rotates the spindle 56 and hence the platters 54 at a constant angular velocity.

The writing to and reading from a disk is done by a read/write head 60, located at the end of a suspension arm 62. In the embodiment of the head disk assembly 50 shown, the suspension arm 62 is radially mounted to an actuator 66 and rotates about an axis 64 so as to move the head 60 toward or away from the center of the disk 54. An actuator motor 67 causes the actuator 66 and suspension arm 62 to rotate and position the head 60 at a given radius from the center of the disk 54 and therefore over a specified track 12.

When there are multiple platters 54, as shown in the figure, a set of suspension arms 62, each with its own head 60, are all attached to the actuator 66 and all rotate about the same axis 64. The single actuator 66 causes the arms 62 to rotate toward or away from the center of the disk 54 simultaneously as a group. When there are multiple platters in a head disk assembly, it is only necessary to write servo information on one of the platters of the assembly.

In the servowriter of the invention, a read/write head 60 of the head disk assembly 50 itself is used to write the servo information on a disk 54. For the servowriter to position the head 60 at a given radial distance accurately, the actuator 66 of the head disk assembly 50 itself is used as part of a feedback loop.

Figure 3:
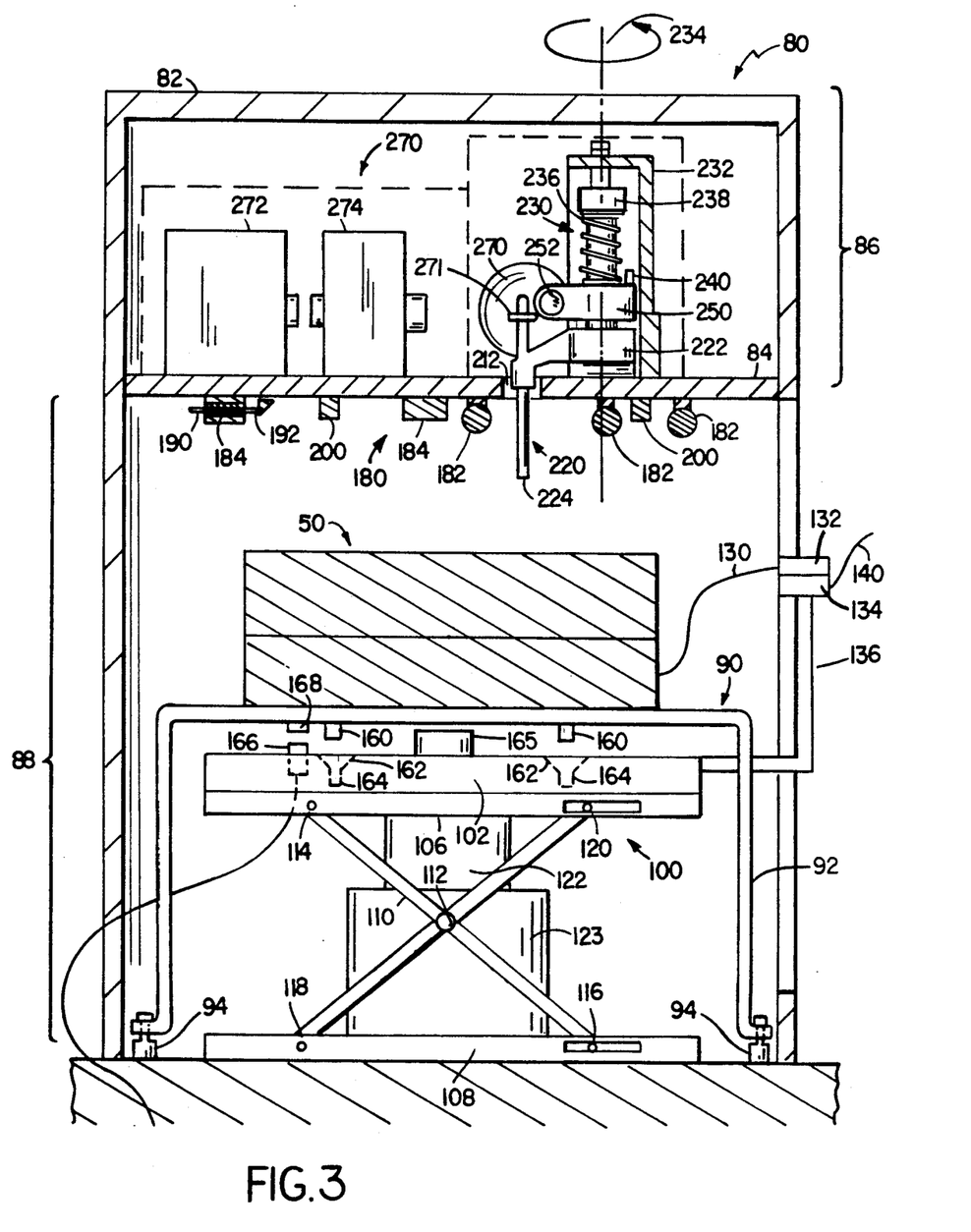
FIG. 3 is a side view of an embodiment of the invention.

An embodiment of a servowriter which utilizes a head 60 and actuator 66 of a head disk assembly 50 to write servo information accurately on a disk 54 is shown in FIG. 3. In broad overview, the servowriter 80 shown includes a housing 82 which is divided by a separation plate 84 into an upper tracking portion 86, which accurately determines the position of the actuator 66 and hence the radial position of the read/write head 60, and a lower clamping portion 88, which assures the position of the head disk assembly 50 within the servowriter 80.

The clamping portion 88 includes a shock absorbing saddle 90 upon which the head disk assembly 50 is first placed in the servowriter 80. The shock absorbing saddle 90 is a strong lightweight bracket 92, which has a shock absorber 94 attached to each corner of the bracket 92. Because of the low mass of the saddle 90, the shock of placing the head disk assembly 50 into position in the servowriter 80, is absorbed by the saddle 90 and shock absorbers 94 rather than the head disk assembly 50. Each shock absorber 94 is attached to the bracket 92 by one end, the other end of the shock absorber 94 being free. In this way, the saddle 90 may be easily lifted within the servowriter 80.

The head disk assembly 50 is moved within the servowriter 80 by an elevator 100. The elevator 100, in one embodiment, includes a support surface 102 supported by a scissors jack assembly. The scissors jack assembly 104 has an upper surface 106 and a lower surface 108 separated by two pairs of crossed braces 110. Each of the crossed braces 110 of a pair are pivotally anchored together at their midpoints 112. One end 114 of one of the braces in a pair is pivotally anchored to the upper surface, while the other end 116 is slidably mounted to the lower surface. Similarly, one end 118 of the other of the pair of braces is pivotally anchored to the lower surface, while the other end 120 is slidably mounted to the upper surface.

As the support surface 102 rises the slidably mounted ends 116, 120 of the braces 110 are drawn toward the center of their respective surfaces, and the braces 110 tend to become vertical. When the support surface 102 is lowered, the ends 116, 120 of the braces 110 are moved toward the edges of their respective surfaces and the braces 110, 120 tend to become horizontal.

The piston 122 of a vertically mounted air cylinder 123 is attached to the support surface 102. As the piston moves within the cylinder 123, the support surface 102 rises or lowers. The position of the piston 122 within the cylinder 123 determines the position of the support surface 102 and the direction and rate of motion of the piston 122 determines the direction (rising or lowering) and rate of motion of the support surface 102. The position and rate of motion of the piston 122 is in turn determined by the amount of air in the air cylinder 123 and the rate at which the cylinder 123 fills or empties. Therefore, by slowly filling the air cylinder 123, the support surface 102 of the elevator 100 can gently raise or lower a head disk assembly 50 resting upon it.

The power and signals to control the actuator 66 enter the head disk assembly 50 by a cable 130 which terminates in a connector 132. This connector 132 mates with a connector 134 permanently attached to the elevator 100 by an extension arm 136. The permanently attached connector 134 supplies power and signals to the head disk assembly 50 by way of a cable 140 from a disk controller (not shown). The extension arm 136 permits the head disk assembly 50 to be connected to the cables 140 supplying power and signals to the actuator 66 when the elevator 100 is in the lowered position and yet not stretch the cables 130 when the head disk assembly 50 is raised by the elevator 100.

Once the head disk assembly 50 is placed on the saddle 90 and the actuator cable 130 is connected to the power and signal cable 140, the elevator 100 is slowly raised from its lowered position. Positioning legs of 160 of the head disk assembly 50 engage chamfered holes 162 in the support surface 102 as the elevator 104 lifts the head disk assembly 50 from the saddle 90. These chamfered holes 162 direct the positioning legs 160 of the head disk assembly 50 into positioning holes 164 in the support surface 102. The engagement of the positioning legs 160 and positioning holes 164 places the head disk assembly 50 approximately in the correct position on the horizontal plane, for writing.

As the positioning legs 160 engage the positioning holes 164, a connector 166, permanently mounted in the support surface mates with a connector 168 in the housing 52 of the head disk assembly 50. This connector 166 provides power and signals to the drive motor 58.

With the continued raising of the elevator 100, the head disk assembly 50 makes contact with protrusions 165 from the support surface 102 and is raised from the saddle 90. The contact of the head disk assembly 50 with the protrusions 165 permit the saddle 90 to fall away from the head disk assembly 50 and yet be raised along by the elevator 100.

The continued raising of the elevator 100 brings the head disk assembly 50 into contact with the positioning elements 180 of the servowriter 80 and into position for writing. The positioning elements 180 of the servowriter 80 establish and maintain the position and orientation of the head disk assembly 50 with respect to the tracking portion 86 of the servowriter 80 when the head disk assembly 50 is in position for writing. The positioning elements 180 of the servowriter 80 include three machined positioning balls 182 and two plunger assemblies 184 mounted on the lower surface of the separation plate 84.

The three positioning balls 182 provide three contact points against which the head disk assembly housing 52 rests when the head disk assembly 50 is in position for writing so as to guarantee the orientation and position of the head disk assembly 50. The two plunger assemblies 184 each have a spring loaded shaft 190 with a chamfered end piece 192. When the head disk assembly housing 52 is placed against the positioning balls 182, the spring loaded shafts 190 of the plunger assemblies 184 apply pressure to the head disk assembly housing 52 to maintain the head disk assembly 50 firmly against the positioning balls 182. As the head disk assembly 50 is raised, vertical position stops 200 come into contact with the top of the head disk assembly 50 and, along with the constant pressure applied by the air cylinder 123, hold the head disk assembly 50 firmly against the positioning elements 180.

The tracking portion 86 communicates with the clamping portion 88 of the servowriter 80 by means of a tracking probe 220. The tracking probe 220 consists of a crank 222 with a tracking pin 224 at its distal end. The tracking pin 224 projects perpendicularly from the crank 222 through an arcuate opening 212 in the separation plate 84 and into the housing 52 of the head disk assembly 50 when the head disk assembly 50 is in position for writing.

The proximal end of the crank 222 is attached to a bearing assembly 230 within a bearing housing 232. The bearing assembly 230 permits the crank 222 to rotate about an axis 234 perpendicular to the separation plate 84. The axis 234 of the bearing 230 is coincident with the center of curvature of the arcuate opening 212 of the separation plate 84 and the center of curvature of the arcuate opening 70 of the housing 52 of the head disk assembly 50, when the head disk assembly 50 is in position for writing. Also mounted on the bearing assembly 230 above the crank 222 is a retroreflector arm 250 which has a corner cube reflector 252 attached to its distal end.

A torsional spring 236, attached at one end to a clamp 238 within the bearing housing 232, encompasses the bearing assembly 236. The other end of the spring attaches to a pin 240 projecting from the retroreflector arm 250. When the crank 222 is rotated clockwise about the bearing axis 234, the retroreflector arm 250 also rotates clockwise causing the torsional spring 236 to tighten. This tightening of the torsional spring 236 generates a restoring force which biases the retroreflector arm 250 and crank 222 in a counter clockwise direction.

When the head disk assembly 50 is in position for writing, that is, adjacent separator plate 84, the tracking pin 224 penetrates the head disk assembly housing 52 through arcuate opening 70 and extends deep enough into the housing 52 to make contact with the side of the actuator 66. The head disk assembly 50 may be sealed against the separator plate 84 by a compressible seal which surrounds the arcuate opening 212 in the separator plate 84 and hence surrounds the arcuate opening 70 in the head disk assembly housing 52. Such a seal, when used used in conjunction with a housing to enclose the tracking portion of 86 of the servowriter 80 prevents dust from entering the head disk assembly 50 when it is in position for writing.

Figure 4:
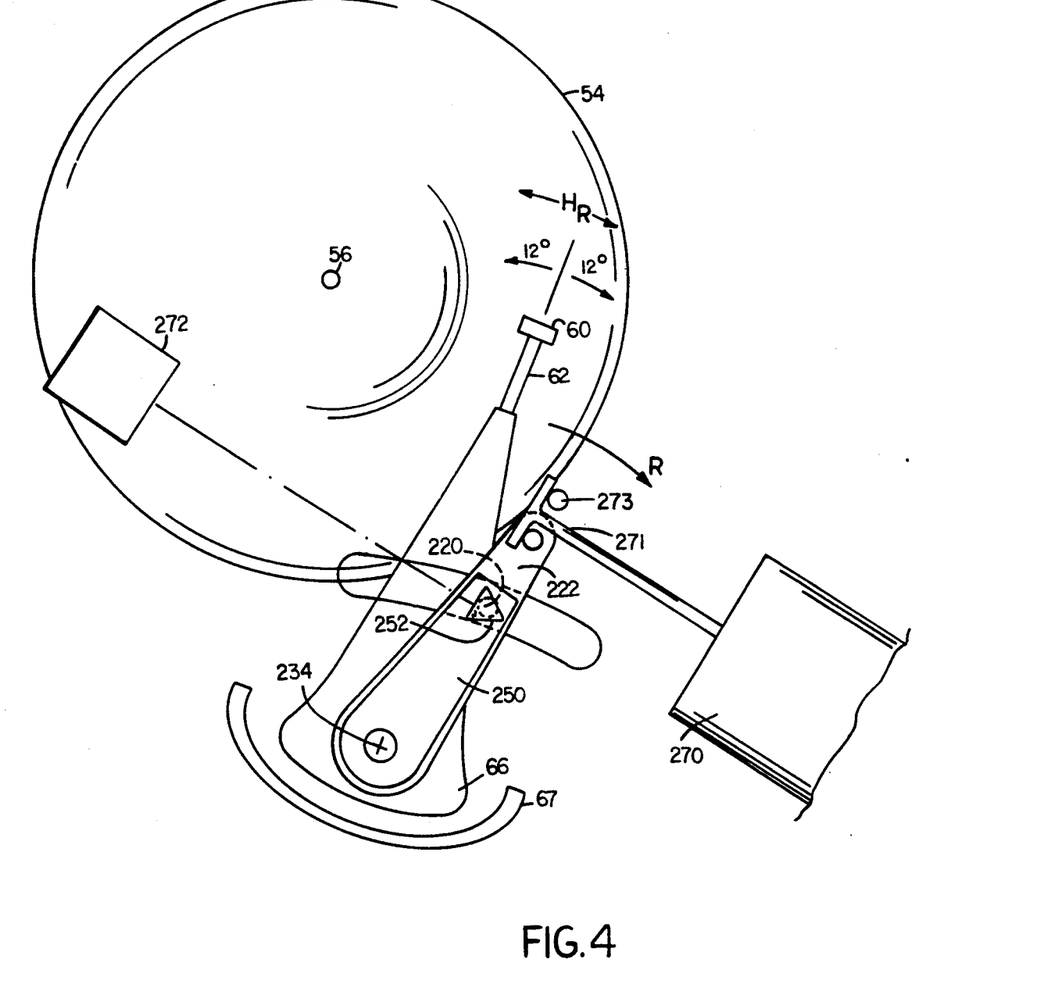
FIG. 4 is a top plan view of a portion of the head disk assembly shown in FIG. 2 positioned against the tracking portion of the embodiment of the invention shown in FIG. 3.

Referring also to FIG. 4, an air piston 270 is located adjacent the bearing housing and provides a movable stop 271 for the crank. The piston of the air cylinder 270 is biased in the retracted position (designated by arrow R) by an internal spring. In the retracted position, the piston 270 pulls the movable stop 271 toward the air piston 270 engaging a contact pin on the crank 222 and causing the crank 222 to rotate and the torsion spring 236 to tighten. The rotation of the crank 222 moves the tracking pin 224 away from the actuator 66. The rotation continues until the distal end of the moveable stop 271 makes contact with a positive stop 273. The positive stop 273 provides a known location from which to measure the movement of the crank 272.

As the air piston fills with air, the piston moves within the cylinder 270, compressing the internal spring and causing the movable stop 271 to move in a direction away from the cylinder 270 and away from the contact pin of crank 222. This permits the torsion spring 236 to relax causing the crank 222 and retroreflector arm 250 to rotate away from the fixed stop 273. The axis 234 of the bearing assembly 230 and the axis 64 of the actuator 66 are coaxial and when the air piston has moved the movable stop 271 out of contact with the the contact pin of crank 222, the tracking pin 224 is biased against the side of the actuator 68 by the restoring force of the torsional spring 236. Therefore, as the actuator 66 rotates (designated by arrow $H_R$) the head suspensions 62 to different radial positions on the disk 54, the tracking pin 274 remains in contact with the actuator 66 and moves along with it.

The highest accuracy in determining the position of the head 60 occurs when the tracking pin 224 makes contact with the actuator 66 at a point between the axis of actuator rotation 64 and the suspension arm 62. The contact between the tracking pin 224 and the actuator 66 may, however, occur at a point between the axis 64 and the actuator drive 67, with a slight loss of accuracy.

The movement of the tracking pin 224 in following the actuator 66 causes the crank 222 to rotate the bearing assembly 230 thereby causing the retroreflector arm 250 to rotate also. The corner cube reflector 252 should be positioned over the tracking pin 224 in order to achieve the highest accuracy. In this way, the position of the actuator 66 and hence the radial position of the heads 60, is indicated by the angular position of the retroreflector arm 250. It is for this relationship to hold true, that it is necessary that axis 64 of the actuator 66 and the axis 234 of the bearing assembly 230 be coaxial and that the position and orientation of the head disk assembly 50 be precisely controlled.

Once the disk drive 58 brings the disks 54 to the desired angular velocity, a disk controller (not shown), by way of the actuator cable 130, attempts to position the head 60 over a precise location over the middle track 12 on the disk 54. From this position over the middle track 12 the actuator 66 can be moved a fixed number of degrees clockwise or counter clockwise to position the head 60 over, respectively, the outermost or innermost track 12 of the disk 54. As the actuator 66 moves, the retroreflector arm 250, by virtue of its attachment to the bearing 230, rotates about axis 234 causing the corner cube reflector 252 located at the distal end of the retroreflector arm 250 to move.

Figures 5, 5A, 5B:
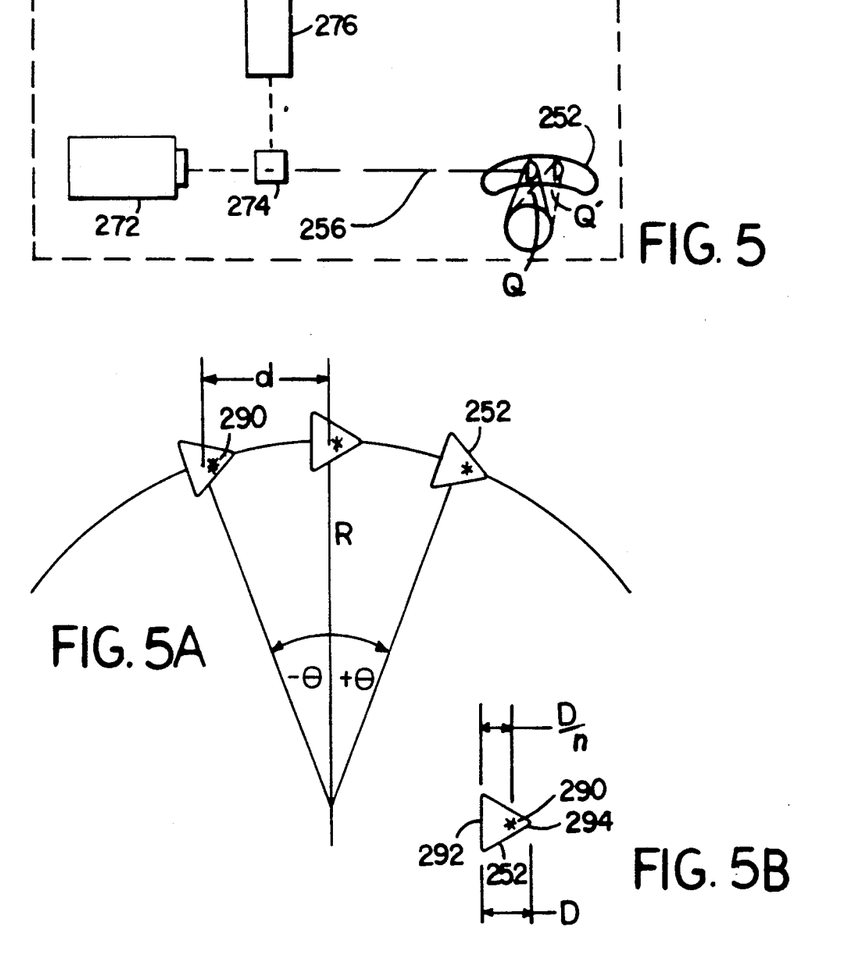
FIG. 5 is a plan view of an embodiment of the interferometer shown in FIG. 3.
FIG. 5A is a diagram of the changes in path length as a function of the position of the reflector of FIG. 5.
FIG. 5B is a diagram of the location of the nodal point of the reflector of FIG. 5A.

Referring to FIG. 5, the movement of the corner cube reflector 252, changes the optical path length 256 of an interferometer 270. The interferometer 270 is a laser interferometer such as manufactured by Hewlett Packard and designated HP 5527A and comprises a laser 272, such as Hewlett Packard HP5517A/B, a single beam interferometer 274, such as Hewlett Packard HP 10705A, a receiver 276, such as Hewlett Packard HP 10780B, control electronics (not shown), such as Hewlett Packard HP5507A and the corner cube reflector 252, such as Hewlett Packard HP10703.

When the head 60 is positioned over the middle track 12 of the disk 54, the light from the laser 272 strikes the corner cube reflector 252 perpendicular to to the front surface of the reflector 252. The change in path length by the movement of the retroreflector arm 250 between positions Q and Q' (shown in phantom) results in a shift in the interference fringes detected by the receiver 276.

By counting the number of fringes which pass by the receiver 276, the linear distance traveled by the corner cube reflector 252 can measured. Referring to FIG. 5A, the linear distance M can be related to the angular displacement $\theta$ by the equation:

$$M = d + E_m$$

where d is the arc distance and is equal to $R \sin\theta$, R is the radius from the center of rotation to the nodal point 290 of the corner cube reflector 252, and $E_m$ is the increase in path length 256 induced by the rotation of the corner cube reflector 252. Referring also to FIG. 5B, if D is the distance from the face 292 of the corner cube reflector 252 to the apex 294 of the corner cube reflector 252, the nodal point 290 is located D/n from the face 292 of the corner cube reflector 252, where n is the index of refraction of the glass of the reflector. Making these substitutions, the total distance M in terms of the angular displacement $\theta$ is given by the equation:

$$M = R\sin\theta + nD[1/[\cos(\sin^{-1}(\sin\theta/n))] - 1] + [(D/n)\tan\theta - D\tan[\sin^{-1}(\sin\theta/n)]]\sin\theta - (D/n)[(1/\cos\theta) - 1]$$

Therefore by using the interferometer 270, the angular displacement and hence the position of the head 60 can be determined precisely. By comparing this position to the desired position and using the error to control a feedback loop, the head 60 can be controlled to a high degree of accuracy.

What is claimed is:

1. Apparatus for writing servo tracks on a magnetic disk in a head disk assembly, said head disk assembly having a head, a movable actuator for positioning the head relative to the disk, and an actuator drive for moving the actuator to position the head at selected radial positions relative to the disk for writing the servo tracks at said positions, said apparatus comprising:
   a support for supporting said head disk assembly in said apparatus in a writing position to have said tracks written;
   a biased tracking element disposed to be biased against, but not mounted to, said actuator when said head disk assembly is in its writing position, thereby to track the movement of said actuator and said head to said selected radial positions; and
   a feedback circuit connected between said tracking element and said actuator drive for monitoring the position of said tracking element as a measure of the radial position of said head and for controlling the action of said drive to move said head to said selected radial positions within a desired degree of radial accuracy.

2. The apparatus of claim 1 wherein said tracking element comprises a pin mounted on a crank, said crank being rotatable about a crank axis.

3. The apparatus of claim 2 wherein said actuator is rotatable about actuator axis and said actuator axis and said crank axis are coaxial when said head disk assembly is in the writing position.

4. The apparatus of claim 2 wherein said biased tracking element is biased by a spring.

5. The apparatus of claim 4 wherein said spring is a torsion spring.

6. The apparatus of claim 4 wherein said spring applies a force just sufficient to cause said tracking element to remain in contact with said actuator without substantially altering the motion characteristics of said actuator.

7. The apparatus of claim 1 wherein a biasing element applies a force to said tracking element just sufficient to cause said tracking element to remain in contact with said actuator without substantially altering the motion characteristics of said actuator.

8. The apparatus of claim 1 wherein said feedback circuit includes a retroreflector mounted to move in accordance with tracking movement of tracking element, and a laser for monitoring the position of reflector.

9. The apparatus of claim 8 wherein said reflector is mounted on said biased tracking element.

10. The apparatus of claim 9 wherein said tracking element comprises a pin mounted on a crank, said crank being rotatable about a crank axis.

11. The apparatus of claim 8 wherein said monitoring of the position of said reflector is performed interferometrically.

12. An apparatus for accurately positioning a head disk assembly having a plurality of positioning structures, said apparatus comprising:
   a bracket for holding the head disk assembly in substantially the correct horizontal position, said bracket being disposed on at least one shock absorber;
   an elevator means for lifting the head disk assembly away from said bracket; said elevator means comprising:
   a horizontal surface having a plurality of positioning structures configured to mate with corresponding ones of said positioning structures of said head disk assembly, said positioning structures of said horizontal surface being arranged so as to be substantially in register with said positioning structures of said head disk assembly when said head disk assembly is in substantially the correct horizontal position, said positioning structures of said horizontal surface and said positioning structures of said head disk assembly being constructed to correct misalignment of said head disk assembly between said substantially correct horizontal position and a correct horizontal position, as said positioning structures mate with each other; and a movement means for moving said horizontal surface in a vertical direction away from said bracket;

a vertical stop means for preventing the vertical motion of the head disk assembly beyond a predetermined vertical location;

a plurality of horizontal stops for preventing the horizontal motion of the head disk assembly beyond a predetermined horizontal location; and a plurality of horizontal biasing means to bias the head disk assembly toward said horizontal stops.

13. Apparatus for writing servo tracks on a magnetic disk in a head disk assembly, said head disk assembly having a head and a moveable actuator for positioning the head relative to the disk for writing the servo tracks at selected radial positions, said apparatus comprising a tracking element disposed, without being mounted to said actuator, to track the movement of said actuator and said head to said selected radial positions, a feedback circuit connected to monitor the position of said tracking element as a measure of the radial position of said head and to control the motion of said actuator to move said head to said selected radial positions within a desired degree of radial accuracy, and a first support for said head disk assembly, said first support being moveable between a retracted position in which said head disk assembly is out of contact with said tracking element so that said assembly is free to be inserted in or removed from said apparatus, and an advanced position in which said tracking element is positioned to track said movement of said actuator.

14. The apparatus of claim 13 wherein said head disk assembly includes a housing having an opening to allow the entrance of said tracking element when said first support is in said advanced position.

15. The apparatus of claim 14 wherein said opening comprises an arcuate slot in said housing.

16. The apparatus of claim 13 wherein said first support is movable along an axis of said apparatus and said apparatus further includes a plurality of aligning members spaced transversely of said axis, said aligning members being spaced from said head disk assembly when said first support is in said retracted position and in contact with said head disk assembly when said first support is in said advanced position so as to align said head disk assembly in the direction transverse to said axis.

17. The apparatus of claim 16 wherein said plurality of aligning members comprises at least one stationary stop member and a movable member is positioned so as to be able of pushing said head disk assembly against said stationary stop.

18. The apparatus of claim 13 wherein said apparatus further comprises a second support for initially receiving said head disk assembly such that said first support is free of said head disk assembly when said first support is in the retracted position, and said first support contacts said head disk assembly placed initially on said second support as said first support moves to said advanced position.

19. The apparatus of claim 18 wherein said first support includes at least one alignment element for coming into contact with said disk assembly as said disk assembly moves to said advanced position.

20. The apparatus of claim 19 wherein said head disk assembly further includes at least one pin and said alignment element comprises a chamfered hole for receiving said pin on said head disk assembly.

21. The apparatus of claim 18 wherein said second support comprises a saddle having shock absorbers.

22. The apparatus of claim 13 wherein said tracking element comprises a tracking pin movable within an arcuate slot in the apparatus.

23. The apparatus of claim 13 wherein said head disk assembly further includes an actuator drive, and said apparatus further comprises an electrical circuit for connection to said actuator drive feed back circuit.

24. The apparatus of claim 23 wherein said first support further comprises a plug for supplying power and signals to said head disk assembly actuator drive.

25. Apparatus for writing servo tracks on a magnetic disk in a head disk assembly, said head disk assembly having a head, a moveable actuator for positioning the head relative to the disk, and an actuator drive for moving the actuator to position the head at selected radial positions relative to the disk for writing the servo tracks at said selected radial positions, said apparatus comprising a tracking element disposed to track the movement of said actuator and said head to said selected radial positions, said tracking element being disposed to be biased against, but not mounted to, said actuator when said head disk assembly is in its writing position;

a feedback circuit connected between said tracking element and said actuator drive for monitoring the position of said tracking element as a measure of the radial position of said head and for controlling the action of said drive to control the motion of said actuator to move said head to said selected radial positions within a desired degree of radial accuracy; and a support for supporting said head disk assembly in said apparatus in a writing position to have said tracks written, said support being moveable between a retracted position in which said head disk assembly is out of contact with said tracking element so that said assembly is free to be inserted in or removed from said apparatus, and an advanced position in which said tracking element is positioned to track said movement of said actuator.

* * * * *

UNITED STATES PATENT AND TRADEMARK OFFICE
CERTIFICATE OF CORRECTION

PATENT NO. : 5,162,955

DATED : November 10, 1992

INVENTOR(S) : Michael N. Burdenko

It is certified that error appears in the above-identified patent and that said Letters Patent is hereby corrected as shown below:

Col. 4, line 13, after "110" delete --120--.

Col. 5, Line 51, after "assembly" delete --236-- (2nd occur.).

Col. 5, line 51, after "spring" add --236--.

Signed and Sealed this

Twenty-second Day of August, 1995

Attest:

BRUCE LEHMAN

Attesting Officer

Commissioner of Patents and Trademarks